Patented Dec. 2, 1930

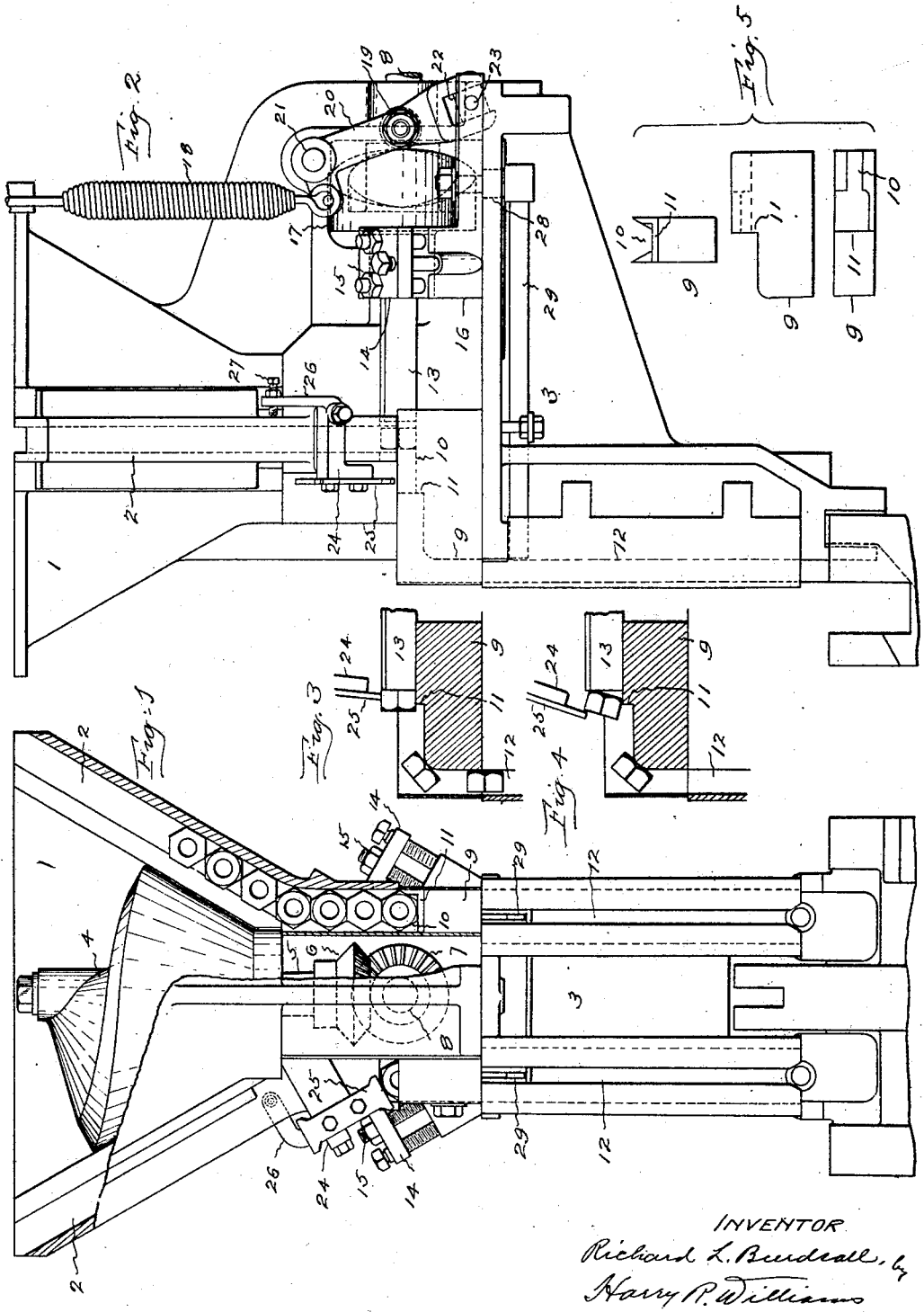

1,783,218

UNITED STATES PATENT OFFICE

RICHARD L. BURDSALL, OF PORT CHESTER, NEW YORK, ASSIGNOR TO RUSSELL, BURDSALL & WARD BOLT & NUT COMPANY, OF PORT CHESTER, NEW YORK, A CORPORATION OF NEW YORK

MACHINE FOR ASSEMBLING NUTS

Application filed January 3, 1930. Serial No. 418,395.

This invention relates to a mechanism which is designed to feed nut blanks from a promiscuous mass in a hopper into line with tools for further operation.

The object of the invention is to provide a relatively simple mechanism which will rapidly feed the nut blanks in such manner that all will surely be faced in the correct position for the subsequent operations.

In the mechanism illustrated the nut blanks are deposited in a hopper and by rotatable agitating means are successively passed therefrom into a chute down which they slide to a trough in a block along which they are pushed one at a time by a reciprocatory plunger until they drop off from a step on the block. The blanks which have their crowned faces forwardly merely tip off from the step so as to lie crowned face down, while the blanks which have their back faces forward are tripped so as to turn over and lie crowned face down. The blanks then pass to a chute down which they drop in the required position for the action of the tools which are to perform the subsequent operations.

Fig. 1 of the accompanying drawings is a front view with parts broken away of a preferred form of the mechanism. Fig. 2 is a side view. Fig. 3 is a detail showing the passage of the blanks which come from the hopper crowned face forward. Fig. 4 is a similar view illustrating the manner in which the blanks with their back faces forward are tripped and turned. Fig. 5 shows a front, side and top view of the step block.

The mechanism illustrated in the drawings is double, that is, there are two chutes leading from the hopper, one on each side, a step block on each side, a plunger on each side, a tripping blade on each side, and a receiving chute on each side, which is the preferred form of the invention, although of course the invention is inherent in a mechanism having but a single set of these elements.

The hopper 1 which is illustrated has an inclined chute 2 on each side and it is mounted on a bracket 3 that may be fastened to any suitable support, which if desired may be a part of the machine which is to perform the further operations on the nut blanks. In the hopper is a rotatable agitator 4 of any approved type which is designed to throw the nut blanks that are deposited in the promiscuous mass in the hopper into the chutes at the sides. The agitator is fastened to a shaft 5 which is provided with a bevel gear 6 that is engaged by a bevel gear 7 on a shaft 8 which may be driven by any convenient means.

In the mechanism shown on each side at the bottom of the chute from the hopper is a block 9. This block has its upper face shaped to provide a trough 10 which conforms in outline to the particular style of nut blanks that are to be faced, and at the forward end of this trough is a step 11. At the front end of the block is a chute 12 that receives the properly faced blanks and down which they drop to position for further treatment.

On each side of the mechanism and adapted to be reciprocated forward and backward under the lower end of the hopper chute and through the trough in the step block is a plunger 13. This plunger is detachably fastened by a clamp plate 14 and bolts 15 to a slide 16 that is movable forward and backward in ways in the top of the supporting bracket. Fixed on the shaft 8 is a cam 17 and held in engagement with this cam by a spring 18 is a roll 19 on a lever 20 that is pivoted at 21. The lower end of this lever is forked and the fork is engaged with a block 22 that is pivoted on a pin 23 which projects from the slide. The slide is drawn back by the cam and moved forward by the spring, and thus the plunger is reciprocated. But a single cam is used in the double machine, which cam operates on the two levers, so the plungers are moved forward and backward alternately.

Loosely pivoted on each side of the hopper is an angle bracket 24 on the front face of which is fastened a trip blade 25. The upwardly extending leg 26 of this bracket carries a screw 27 which may be adjusted to determine the downward limit of the lower end of the trip blade. Fastened to each slide 16 by a bolt 28 is a bar 29 that extends to the chute 12.

The yielding trip blades 25 extend sufficiently into the paths of the nut blanks to engage the corners of the blanks as they are pushed along the step blocks by the plungers. When a blank so drops as to be pushed along the step block with the back face against the plunger, the trip blade engages a rounded corner of the crowned face of the blank and swings up so that the blank will pass under it and drop off the step with the crown face down, Fig. 3. If a blank is so positioned that it is pushed along the step block with the crowned face against the plunger the trip block engages a square edge of the blank and tips it over so that it will drop off the step with the crowned face down, as indicated in Fig. 4. By this means no matter which way they are faced coming down from the hopper all the blanks are faced on the block in front of the step in the same direction and consequently all will drop down the discharge chute facing the same.

Should a discharge chute become full of blanks, the bar 29 that normally passes through that chute as the slide reciprocates, will engage the top blank and hold back the slide so that it will not feed a nut until the stack in the chute is lowered below the level of the bar, the spring 18 yielding to permit this.

The invention claimed is:

1. A mechanism for assembling nut blanks comprising a hopper having a chute down which the blanks gravitate, a block with a downward step on its upper face, located below said chute, a plunger movable across said block and adapted to push blanks successively from the lower end of the chute across the block and over said step, yielding means extending into the path of the pushed blanks, said means passing such blanks as are pushed with their crowned faces forward and tripping such blanks as are pushed with their back faces forward, and a chute for receiving the blanks thus manipulated.

2. A mechanism for assembling nut blanks comprising a hopper having a chute down which the blanks gravitate, a block with a trough for receiving blanks from the chute and a step for tipping the blanks, a plunger movable through said trough and adapted to push blanks successively from the trough and over said step, yielding means extending into the path of the blanks, said means passing such blanks as are pushed with their crowned faces forward and tripping such blanks as are pushed with their back faces forward, and a chute for receiving the blanks thus manipulated.

3. A mechanism for assembling nut blanks comprising a block with a trough for receiving the blanks and a step for tipping the blanks, a plunger movable through said trough and adapted to push blanks successively from the trough across the block and over said step, and yielding means extending into the path of the pushed blanks, said means passing such blanks as are pushed with their crowned faces forward and retarding and tripping such blanks as are pushed with their back faces forward.

4. A mechanism for assembling nut blanks comprising a hopper having a chute on each side down which the blanks gravitate, a block with a downward step on its upper face, located below each chute, a plunger movable across each block, said plungers being arranged to push blanks successively from the lower ends of the chutes across the blocks and over said steps, slides carrying the plungers, springs for moving the slides forward and a single cam for retracting the slides, means extending into the paths of the pushed blanks, said means yielding and passing such blanks as are pushed with their crowned faces forward and retarding and tripping such blanks as are pushed with their back faces forward, and chutes for receiving the blanks thus manipulated.

RICHARD L. BURDSALL.